UNITED STATES PATENT OFFICE.

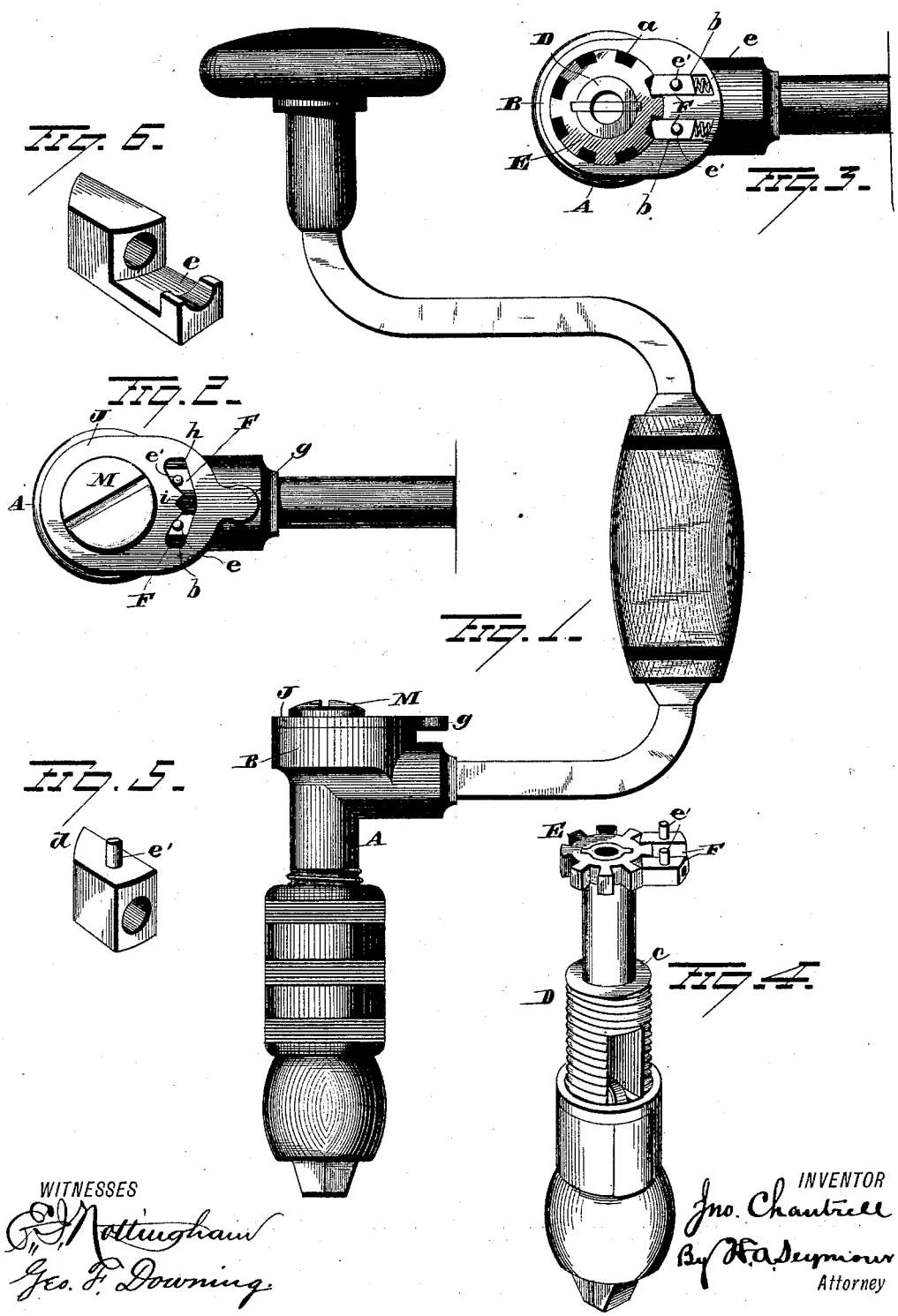

JOHN CHANTRELL, OF BRIDGEPORT, CONNECTICUT.

RATCHET-BRACE.

SPECIFICATION forming part of Letters Patent No. 302,320, dated July 22, 1884.

Application filed February 13, 1884. (No model.)

*To all whom it may concern:*

Be it known that I, JOHN CHANTRELL, of Bridgeport, in the county of Fairfield and State of Connecticut, have invented certain new and useful Improvements in Ratchet-Braces; and I do hereby declare the following to be a full, clear, and exact description of the invention, such as will enable others skilled in the art to which it appertains to make and use the same.

My invention relates to an improvement in ratchet-braces, the object of the same being to provide a cheap and positive-acting brace that will be durable in use and not easily deranged; and with this end in view my invention consists in the parts and combinations of parts, as will be more fully described, and pointed out in the claims.

In the accompanying drawings, Figure 1 is a view in side elevation of a brace embodying my invention. Fig. 2 is a plan view of the stock showing the shifting-cap in position. Fig. 3 is a similar view with the shifting-cap removed. Fig. 4 is a perspective of the chuck and dog detached. Fig. 5 is a view of one of the dogs, and Fig. 6 is a view of a modified form of dog.

A represents the brace-stock, the upper end, B, of which is enlarged and provided with the elongated circular bearing, in which the upper end of the chuck D is movably secured. This bearing is elongated for the purpose of forming a firm support for the end of the chuck, and the latter rests snugly therein without any lateral and endwise movement. The upper or inner face of the stock is provided with a circular recess, $a$, for the ratchet-wheel E, and two parallel recesses, $b$, in which the spring-actuated dogs or pawls F rest and move. These parallel recesses open into the circular recess to enable one or both of the dogs to be in contact with the ratchet-wheel. The ratchet-wheel E is removably keyed to the upper end of the chuck D, and is prevented from displacement by the large-headed screw M, the shank of which screws into the female screw-threaded end of the chuck D. This chuck is provided with a shoulder, $c$, which prevents it from moving longitudinally in one direction, while the wheel E, which is secured to the upper end of the chuck, prevents it from moving in the opposite direction. The recesses $a$ and $b$ are sufficiently deep to enable the wheel E and dogs F to rest therein flush with the upper surface of the enlarged head B of the chuck.

The dogs F are made of metal, and are sufficiently heavy to withstand the constant strain exerted on them, and each is provided with a curved outer face, $d$, which latter enables the dogs to be moved in by the teeth of the wheel when the latter is turned in one direction, and to engage the teeth when the wheel is moved in the opposite direction. These dogs are forced into contact with the wheel by the small spiral springs $e$, which latter are preferably seated in sockets formed in the dogs, while their free ends bear against the end walls of the recesses $b$. By seating the springs in sockets formed in the dogs there is no danger of displacing or losing the springs while taking the device apart. Each dog is also provided on its upper face with a lug, $e'$, which latter projects upwardly through the slotted shifting cap. These dogs are so situated as to engage the ratchet-wheel near opposite sides for the purpose of turning the chuck in opposite directions, and also for locking the chuck against movement independently of the stock.

The shifting-cap J conforms in shape to the contour of the head B of the stock, and is provided with an opening for the passage of the shank of the screw M. The head of this screw rests directly over and bears lightly on the plate and prevents the displacement of the cap, while the shank of the screw immediately below the head forms the pivot on which the cap turns. This cap covers the wheel and pawls, and besides presenting a neat and finished appearance to the device and protecting the wheel and pawls from the dust, also forms a lever, by means of which the pawls are operated. This cap is provided with the projecting thumb-piece $g$, by means of which its position can be changed, and with the slot $h$, which latter is considerably narrowed in the center by the walls nearer the wheel converging. At the meeting-point of these converging walls a small V-shaped notch, $i$, is formed for the purpose of holding the lugs of one of the pawls or dogs. The lugs on the pawls pass upward through the slot $h$, and, when the chuck is locked against movement in either direction independent of the stock, they (the lugs) rest on opposite sides of the small V-shaped notch.

When it is desired to convert the rigid brace thus formed into a ratchet-brace, the shifting cap is partly turned until one of the lugs has been moved by the inclined plane back until it rests within the slot *i*. This movement of the lug carries the dog to which it is secured away and out of contact with the wheel, leaving the other dog, which latter is only capable of preventing the chuck from moving in one direction, in contact with the wheel. By moving the dog rearwardly the spring which operates the same is considerably compressed, and when the dog enters the slot *i* the whole force of the spring is exerted on the shifting-plate, and the latter is held against accidental movement. Now, by moving the shifting-plate in the opposite direction, the dog which was formerly in contact with the wheel is moved out of contact therewith, and the dog which was out of contact allowed to engage the same. When the cap is adjusted so that the slot *i* rests between the two lugs, both dogs are in contact and the chuck is prevented from moving independently in either direction. In the present instance the dogs are only separated the width of one of the teeth of the wheel; but it is evident that they can be made to take in more than one, if desired.

If desired, the shifting-plate can be rigidly secured in position, and pawls similar to those shown in Fig. 6 can be used. In this construction the rear end of each dog is provided with an inclined slot, *o*, through which passes a sliding wedge. The springs in this instance are situated below the wedges and serve to hold the dogs in contact with the wheel. One wedge for both pawls, or an independent wedge for each pawl, can be used and accomplish the same result. The ends of this wedge or wedges project from the enlargd head B sufficiently to enable them to be operated.

Any style of chuck can be employed with the stock, or the ratchet arrangement can be applied to screw-drivers and wrenches without materially altering their structure or arrangement.

It is evident that many slight changes might be made in the relative arrangement of the different parts without departing from the spirit of my invention, and hence I would have it understood that I do not confine myself to the exact construction shown and described, but consider myself at liberty to make such changes and alterations as fairly fall within the spirit and scope of my invention.

Having fully described my invention, what I claim as new, and desire to secure by Letters Patent, is—

1. The combination, with a stock having an enlarged recessed end and two spring-actuated longitudinally-sliding dogs situated in said recessed end and separated from each other, each of said dogs being provided with an outwardly-projecting lug, of a chuck having a ratchet-wheel thereon, which latter rests within the recess of the stock, and a shifting-cap covering the ratchet-wheel, and provided with means, substantially as described, for holding one or both of the dogs in contact with the wheel, substantially as set forth.

2. The combination, with the stock having an enlarged recessed end and two spring-actuated longitudinally-sliding dogs situated in said recessed end, each of said dogs being provided with an upwardly-projecting lug, of a chuck, a ratchet-wheel secured thereon and resting in the recess in the end of the stock, and the shifting cap held in position over the wheel by the screw M, and provided with the slots *h*, one side wall of which forms double-inclined planes, and with the V-shaped slot *i*, all of the above parts combined as described.

In testimony whereof I have signed this specification in the presence of two subscribing witnesses.

JOHN CHANTRELL.

Witnesses:
H. E. BOWSER,
L. S. CATLIN.